United States Patent
Johnen

(10) Patent No.: US 6,921,080 B2
(45) Date of Patent: Jul. 26, 2005

(54) SHAFT SEALING RING

(75) Inventor: Rolf Johnen, Wiemersdorf (DE)

(73) Assignee: Dichtungstechnik G. Bruss GmbH & Co., Hamburg (DE)

(*) Notice: Subject to any disclaimer, the term of this patent is extended or adjusted under 35 U.S.C. 154(b) by 0 days.

(21) Appl. No.: 10/312,011

(22) PCT Filed: Jul. 3, 2001

(86) PCT No.: PCT/EP01/07606
§ 371 (c)(1),
(2), (4) Date: Mar. 14, 2003

(87) PCT Pub. No.: WO02/04846
PCT Pub. Date: Jan. 17, 2002

(65) Prior Publication Data
US 2003/0189293 A1 Oct. 9, 2003

(30) Foreign Application Priority Data
Jul. 10, 2000 (DE) .......................... 100 33 446

(51) Int. Cl.⁷ .............................. F16J 15/32
(52) U.S. Cl. ...................... 277/549; 277/559
(58) Field of Search ................. 277/549, 553, 277/559–560

(56) References Cited

U.S. PATENT DOCUMENTS

| | | | | |
|---|---|---|---|---|
| 3,620,540 A | * | 11/1971 | Jagger et al. ............... | 277/559 |
| 3,661,400 A | * | 5/1972 | Weinand ..................... | 277/559 |
| 3,913,925 A | | 10/1975 | Gyory | |
| 3,985,487 A | * | 10/1976 | Clark ......................... | 425/304 |
| 4,118,856 A | * | 10/1978 | Bainard et al. .............. | 29/511 |
| 4,568,092 A | * | 2/1986 | Hayashida et al. ......... | 277/559 |
| 4,709,930 A | * | 12/1987 | Forch ......................... | 277/430 |
| 5,044,642 A | * | 9/1991 | Vogt et al. .................. | 277/559 |
| 5,104,603 A | * | 4/1992 | Saitoh ........................ | 264/249 |
| 5,507,505 A | * | 4/1996 | von-Arndt et al. .......... | 277/560 |
| 5,553,866 A | * | 9/1996 | Heinzen ..................... | 277/551 |
| 5,615,894 A | * | 4/1997 | vom Schemm ............. | 277/559 |
| 6,336,638 B1 | | 1/2002 | Guth et al. | |
| 6,354,598 B1 | * | 3/2002 | Huang ........................ | 277/551 |

FOREIGN PATENT DOCUMENTS

| | | | |
|---|---|---|---|
| DE | 195 39 057 | 4/1997 | |
| DE | 198 21 146 | 11/1999 | |
| EP | 0 999 388 | 5/2000 | |
| EP | 1211444 A2 | * 6/2002 | ............ F16J/15/32 |

* cited by examiner

*Primary Examiner*—Alison Pickard
*Assistant Examiner*—Vishal Patel
(74) *Attorney, Agent, or Firm*—Duane Morris LLP

(57) ABSTRACT

A sealing ring for a shaft (3), characterized by a sealing lip (1) made of an elastomer material is flexionally dimensioned with a flexional elasticity which is sufficient for pressing a sealing section (10) of the sealing lip (1) against the surface of the shaft (3). The sealing section (11) of the sealing lip (1) is disposed with a cylindrical part of a given length (L) on the periphery of the shaft (3). The sealing lip (1) is provided with a thread (5) at least along the above-mentioned length on the shaft side, whereby a discharged medium is transported back to the sealing area (M) when the shaft (3) is rotated. By dimensioning accordingly, it is possible to dispense with an additional spring for pressing a sealing lip (1) against the shaft (3). The thread (5) is also sealed off from the surrounding area (U) in order to prevent the medium to be sealed from flowing out when the shaft (3) is not in operation.

19 Claims, 3 Drawing Sheets

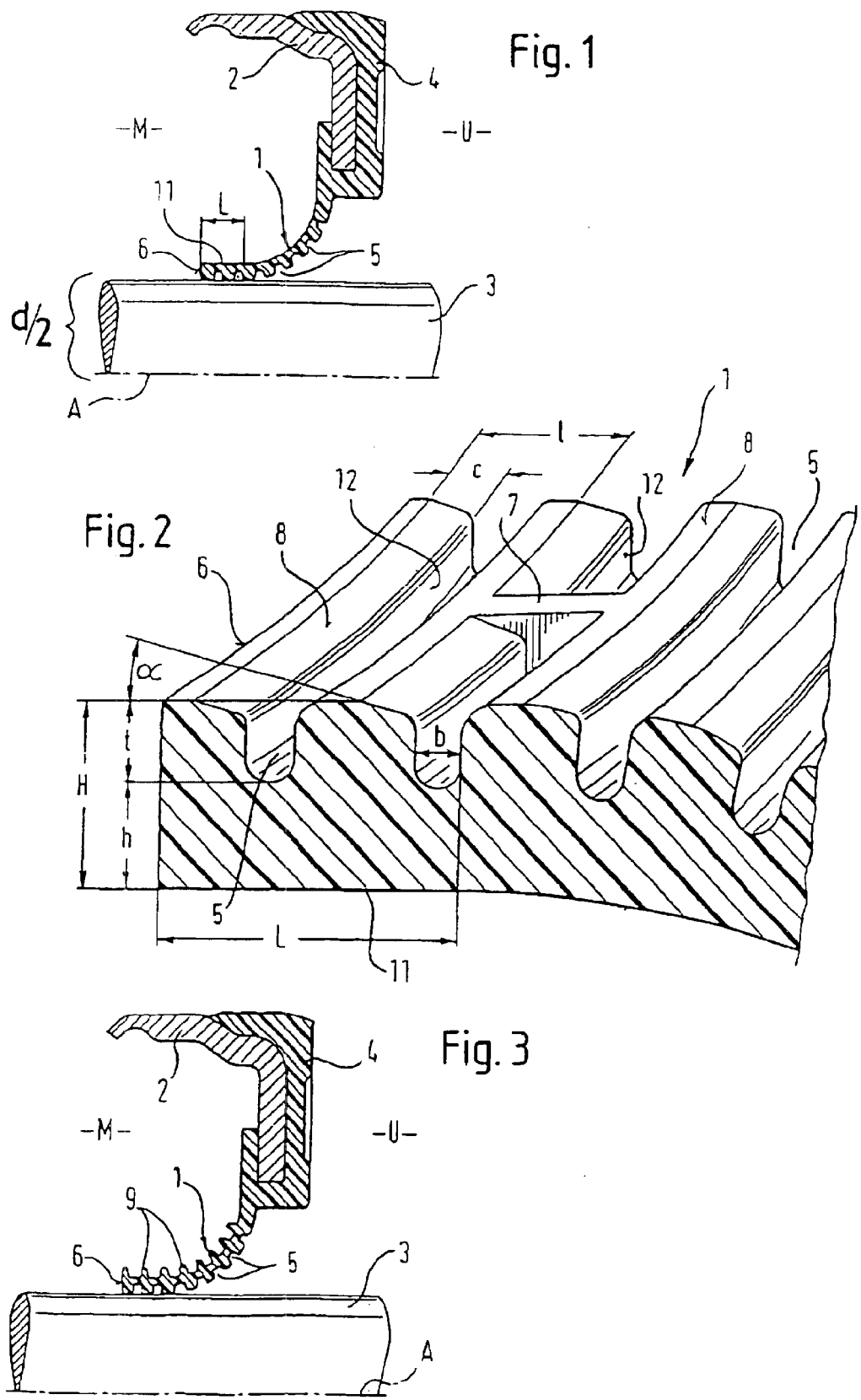

SHAFT SEALING RING

The invention relates to a shaft sealing ring comprising a sealing lip made of elastomeric material, as known from U.S. Pat. No. 3,913,925.

During the past years shaft sealing rings of elastomeric material often were replaced by shaft sealing rings whose sealing lips were made of polytetrafluoroethylene (PTFE) when intended for sophisticated applications, such as to be used in modern internal combustion engines. It has been suggested with such shaft sealing rings to provide a thread in a sealing portion thereof which will be in contact with a surface area of the shaft, when the shaft sealing ring is mounted, so as to return the medium to be retained (lubricant) back into the space to be sealed when the shaft rotates (cf. H. K. Mueller "Abdichtung bewegter Maschinenteile", 1990, Medienverlag Ursula Mueller, pages 42, 43, picture 18-RD).

The problem with such shaft sealing rings having a sealing lip of PTFE is that they afford sealing only "dynamically", i.e. when the shaft is rotating, while they do not seal "statically", i.e. with the shaft at standstill. Moreover, manufacturing is rendered difficult due to the close tolerances to be observed as regards the concentricity of the sealing ring and the shaft as well as the admissible gap width between the shaft and the casing.

In connection with radial shaft sealing rings having an essentially radially oriented elastomer sealing lip, so-called hydrodynamic sealing aids are known which operate in the manner of "windshield wipers" (cf. pages 39, 40 and picture 14-RD of the book cited above by H. K. Mueller). Such shaft sealing rings, as a rule, are provided with a so-called worm spring to press the sealing lip against the periphery of the shaft. The radial contact pressure exerted by the worm spring, which pressure represents the contact pressure of the sealing lip in relation to the shaft periphery, the spring may lead to excess temperature and thus cause damage in the contact zone of the sealing lip. Such damages often reduce the service life.

It is the object of the invention to provide a shaft sealing ring, including an elastomer sealing lip, able to withstand high circumferential speeds and vibrational loading of the shaft, offering a longer useful life than known shaft sealing rings having an elastomer sealing lip, assuring static integrity of the seal and avoiding premature failure, and furthermore warranting simple and therefore inexpensive manufacture.

This object is met by claim 1.

The flexible or pliable "flaccid" design of the elastomer sealing lip according to the invention allows the sealing lip, when mounted, to come to lie snugly tangentially against a surface area of the shaft for a predetermined length thereof by a sealing portion, as is the case with the known PTFE sealing lips. By careful dimensioning of the sealing lip the flexural elasticity can be selected just so that it will assure dynamic sealing since the sealing portion will accompany vibrational motions of the shaft due to its flexible and pliable or flaccid nature. As the sealing portion engages the surface of the shaft throughout a surface area of predetermined axial length the contact pressure is less in comparison with a sealing lip which is pressed against the shaft surface through at the tip alone, whereby the specific friction is reduced so that excess temperatures which would damage the sealing lip cannot be generated any more, thereby contributing substantially to a longer service life.

Omitting the spring, on the one hand, likewise brings about a reduction in contact pressure and, on the other hand, permits the sealing lip to be made in one piece, thereby increasing reliability and lowering manufacturing costs.

Contact pressure values, in practice, are below 0.8 N/cm, preferably lying in a range between 0.1 and 0.4 N/cm.

The thread may be a single or a multiple thread and it may be embodied by a thread groove or a raised thread fin.

A shaft sealing ring according to the invention is effective also when the shaft is not rotating, in other words it acts to seal also statically due to the fact that the thread is blocked towards the surroundings. Such blocking may be obtained by a web which blocks the thread groove, or it may be obtained by the groove or rib of the thread flattening or merging into the surface of the sealing lip towards the end facing the side of the surroundings.

A shaft sealing ring according to the invention is especially well suited for sealing crank shafts or cam shafts of internal combustion engines running at high rotational speed.

Advantageous further developments, in particular advantageous dimensioning measures are protected by the subclaims.

The invention will be described further, by way of example, with reference to the accompanying drawings, in which:

FIG. 1 is a part cross sectional elevation of a shaft sealing ring according to the invention;

FIG. 2 is an enlarged perspective presentation of a sealing portion of the shaft sealing ring illustrated in FIG. 1, the shaft being omitted;

FIG. 3 is a view similar to FIG. 1, showing a modification of a shaft sealing ring according to the invention;

Figure 4:
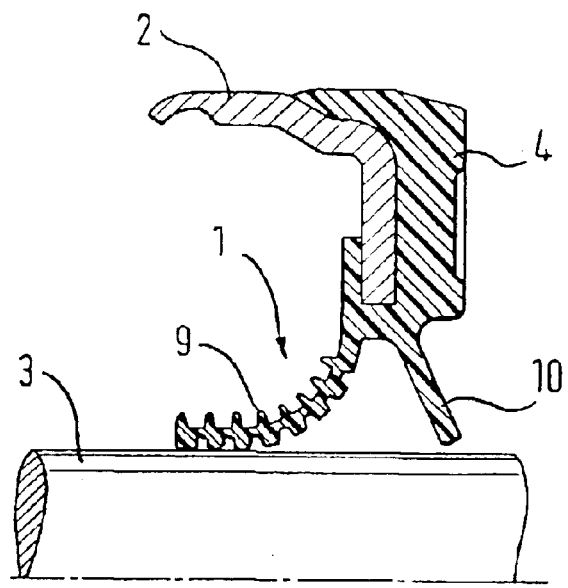
FIG. 4 is a view similar to FIG. 1, showing another modification of a shaft sealing ring illustrated in FIG. 3.

A shaft sealing ring as shown in FIG. 1 comprises a sealing sleeve 4 made of an elastomer and connected directly to a stiffening plate 2 by vulcanizing. By virtue of its dimensioning, the sealing lip is pliable or "flaccid" (=easy to be bent).

When not installed, the sealing lip 1 is stretched out radially (cf. FIG. 5) and has an inner diameter which is smaller than the outer diameter of the shaft 3 to be sealed. Once mounted, the sealing lip 1 is curved in a direction parallel to the axis A of the shaft 3 so that the sealing lip approaches the shaft tangentially and has a cylindrical portion 11 entering into surface area contact, along a length L, with the periphery of the shaft under slight contact pressure caused by the flexural resistance of the sealing lip 1. The dimensions of the sealing lip are selected such that the contact pressure exerted on the periphery of the shaft 3 will fall in a range between 0.1 and 0.8 N/cm, preferably between 0.1 and 0.4 N/cm.

Helical return channels in the form of a thread 5 are cut out at the side of the sealing lip 1 facing the surroundings U. Instead of a thread 5, other forms of return channels may be provided, such as parallel, closed, annular channels extending at an angle with respect to the axis. What is important is that the return channels extend throughout the full length L of portion 11 so that any medium which has escaped the space to be sealed M can be returned by the thread 5 into said space M over the free end 6 of the sealing lip 1.

The cylindrical part 11 of the sealing portion, having a length L, surrounds the shaft 3 coaxially with the axis A and is in engagement with the shaft 3. The flexural design of the sealing lip 1 allows this part 11 of the sealing portion to follow every shaft movement because only very small flexural resistances of the sealing sleeve occur thanks to this design so that a gap cannot form between the cylindrical part 11 and the surface of the shaft 3. Various measures are conceivable to obtain the desired flexural elasticity, one of them being the choice of an elastomer which has the appropriate elasticity behavior. Preferred dimensioning measures regarding the size of the sealing lip 1 will now be described in greater detail with reference to FIG. 2.

The following designations apply regarding the sector of the sealing lip illustrated in FIG. 2 which shows the sealing lip in the same curved condition, mounted on the shaft 3 (not shown) as in FIG. 1:

| | |
|---|---|
| d | shaft diameter |
| l | length along the axis between adjacent threads |
| l' | pitch of thread 5 (l' = 1/d) |
| t | depth of thread groove |
| b | width of thread goove |
| c | width of runout surface 8 |
| H | overall thickness of sealing lip 1 |
| h | effective thickness of sealing lip 1 in area of thread 5 |
| α | angle of inclination of runout surface c. |

The arrangement of the runout surface 8, as characterized by angle a and width c, along the flank 12 of the thread 5 facing in the direction of the surroundings U may be taken from FIG. 2.

In this embodiment the thread 5 is a single thread.

FIG. 2 also shows the position of a web 7 which blocks the thread groove towards the side of the surroundings U in the runout area of the thread 5 so as to prevent leakage of lubricating oil to the side of the surroundings U when the shaft 3 is at standstill.

Studies carried out by the inventors have demonstrated that the following relationships and dimensional ranges should be observed in order to obtain the desired flexural behavior of the sealing lip 1:

$L/l \geq 2.0$; preferably $2.3 < L/l \leq 3.2$ $0.2 < c/l \leq 0.5$; preferably $0.28 < c/l \leq 0.34$ $0.3 < t/b \leq 1.0$; preferably $0.3 < t/b \leq 0.7$ $0.25 \text{mm} < h \leq 1 \text{ mm}$; preferably $0.3 \text{ mm} < h \leq 0.5 \text{ mm}$ $3° < \alpha \leq 30°$; preferably $10° < \alpha \leq 20°$.

FIG. 3 shows a shaft sealing ring which differs from the shaft sealing ring according to FIGS. 1 and 2 only by cooling ribs 9 which extend in thread-like fashion and are formed integrally with the sealing lip 1 at the side facing the space to be sealed M. It is the function of the cooling ribs 9 to better dissipate frictional heat from the lubricating oil which is in intensive contact with the material of the sealing lip 1 in the return channels of the thread 5.

In addition to the cooling ribs 9 described above, the other modification shown in FIG. 4 comprises a protective lug 10 directed towards the side of the surroundings U and serving to hold off foreign particle matter, such as dust, dirt or water droplets.

Figure 5:
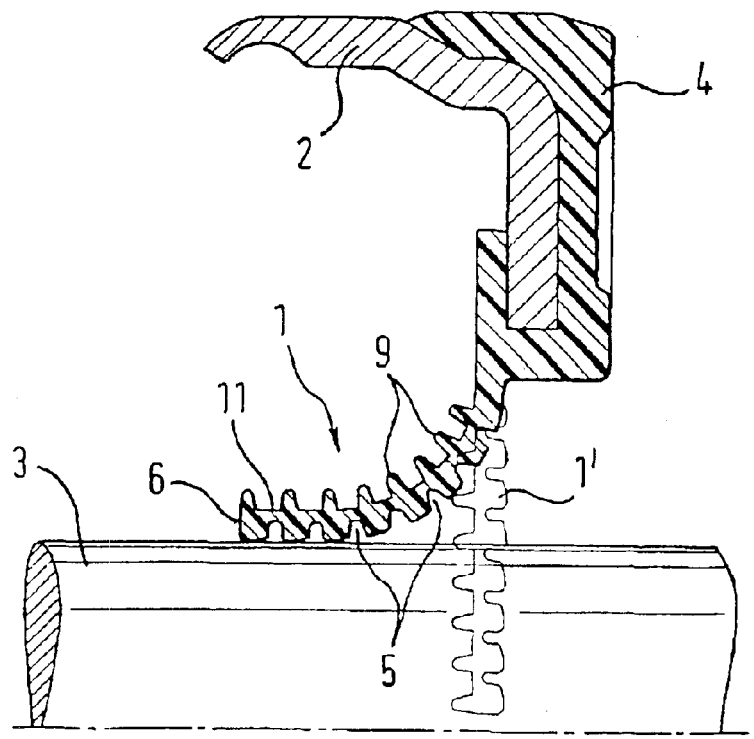
FIG. 5 is a view of a shaft sealing according to FIG. 4, on an enlarged scale, showing in addition the sealing lip in a state before mounting of the shaft sealing ring, i.e. with no shaft present.

FIG. 5 is a presentation of a shaft sealing ring according to FIG. 3, illustrating the sealing lip 1 as mounted on the shaft and, in thin lines, showing the sealing lip 1' as manufactured, with the shaft 3 omitted. The magnitude of the radial contact pressure exerted on the shaft 3 by the sealing lip 1, when installed, can be adjusted in defined manner between the extremes (l) and (l') by suitable positioning of the sealing lip 1 in the mold (not shown).

Figure 6A:
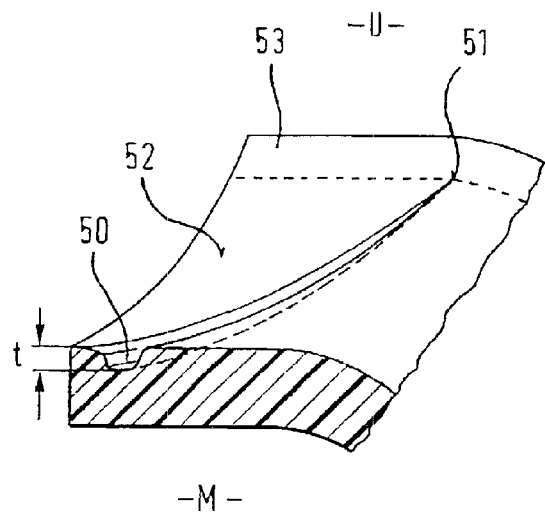
FIGS. 6a and 7a are enlarged partial views similar to FIG. 2, showing two differently modified shaft sealing rings according to the invention.
Figure 6B:
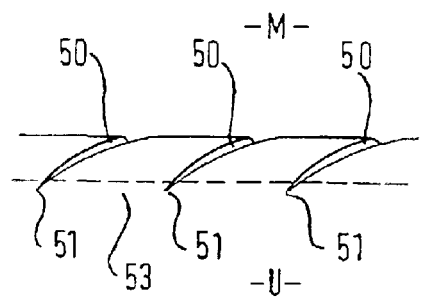
FIGS. 6b and 7b are partial views, on a reduced scale, of the modified shaft sealing rings illustrated in FIGS. 6a and 7a, respectively.

The modified shaft sealing ring according to FIGS. 6a and 6b, which show the shaft sealing ring in a manner similar to FIG. 2, is provided with a multiple thread having thread grooves 50. In other aspects the contouring is similar to the embodiment of FIG. 2. A difference exists inasmuch as the thread grooves 50 have a depth t which diminishes continuously towards the side of the surroundings U until, ultimately, they end at point 51 by merging into the surface (52) of the sealing lip. Beyond the points 51, the sealing lip 1 enters into uniform sealing contact with the periphery of the shaft, by its portion 53.

Figure 7A:
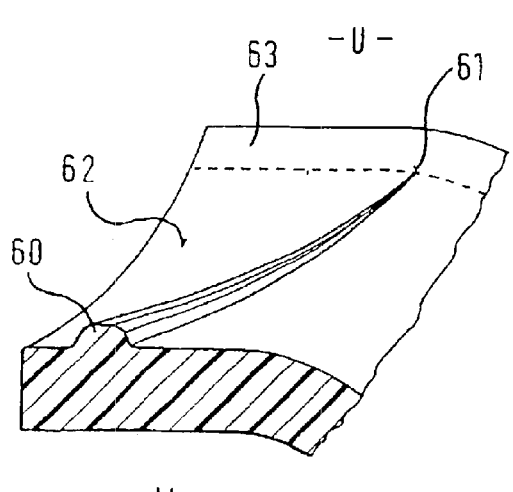
Figure 7B:
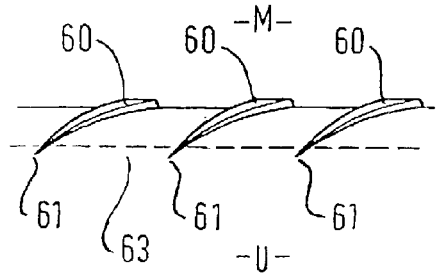

The modified shaft sealing ring according to FIGS. 7a and 7b likewise is provided with a multiple thread, yet the thread grooves 50 are replaced by thread ribs 60. In a manner similar to the shaft sealing ring according to FIGS. 6a and 6b, the thread ribs become ever flatter towards the side of the surroundings U until they finally merge at point 61 into the surface 62 of the sealing lip. In its portion 63 beyond point 61 the sealing lip engages the shaft all around the periphery thereof so that once again the thread is blocked against leakage of the medium towards the surroundings U.

The features disclosed in the specification above, in the claims and drawings may be significant for implementing the invention in its various embodiments, both individually and in any combination.

What is claimed is:

1. A shaft sealing ring for a shaft comprising the following features:
   (a) the shaft sealing ring includes a sealing lip made of an elastomer;
   (b) the sealing lip is flexible, its flexural elasticity being chosen just sufficient to press a sealing portion of the sealing lip into sealing engagement with the surface of the shaft;
   (c) the sealing portion of the sealing lip engages the periphery of the shaft for a predetermined length;
   (d) at least throughout the length mentioned, the sealing lip is provided with a thread at the side facing the shaft to return exiting medium during rotation of the shaft to the space to be sealed;
   (e) the shaft sealing ring does not include a spring; and
   (f) the thread is blocked towards the surroundings
wherein the ratio between the engaging length of the sealing portion and the pitch of the thread is at least 2.0.

2. The shaft sealing ring as claimed in claim 1 characterized in that the thread is a single thread.

3. The shaft sealing ring as claimed in claim 1, characterized in that the thread comprises a conically tapering runout surface along a flank facing the surroundings.

4. The shaft sealing ring as claimed in claim 3, characterized in that the ratio between the width of the runout surface and the pitch of the thread lies in the range of from 0.2 to 0.5.

5. The shaft sealing ring as claimed in claim 4, characterized in that the angle of inclination of the runout surface lies in the range of from 30° to 30°.

6. The shaft sealing ring as claimed in claim 1, characterized in that the thread comprises a thread groove, the ratio between the depth and the width of the groove lying in the range of from 0.3 to 1.0.

7. The shaft sealing ring as claimed in claim 6, characterized in that the effective thickness of the sealing lip in the area of the thread, as measured from the bottom of the groove, lies in the range of from 0.25 to 1 mm.

8. The shaft sealing ring as claimed in claim 1, characterized in that the thread comprises a thread rib.

9. The shaft sealing ring as claimed in claim 1, characterized in that a web blocks the thread towards the surroundings in the runout area.

10. The shaft sealing ring as claimed in claim 1, characterized in that the thread merges into the sealing lip surface towards the end of the contact surface.

11. The shaft sealing ring as claimed in claim 1 characterized in that the thread is a multiple thread.

12. The shaft sealing ring as claimed in claim 1, characterized in that the sealing contact pressure referred to the periphery of the shaft lies in the range of from 0.1 to 0.8 N/cm.

13. The shaft sealing ring of claim 1 wherein the ratio between the engaging length of the sealing portion and the pitch of the thread is in the range of from 2.3 to 3.2.

14. The shaft sealing ring as claimed in claim 4, wherein the ratio between the width of the runout surface and the pitch of the thread lies in the range of from 0.28 to 0.34.

15. The shaft sealing ring as claimed in claim 5, wherein the angle of inclination of the runout surface lies in the range of from 10° and 20°.

16. The shaft sealing ring as claimed in claim 6, wherein the ratio between the depth and the width of the groove lying in the range of from 0.3 to 1.0.

17. The shaft sealing ring as claimed in claim 7, wherein the effective thickness of the sealing lip in the area of the thread, as measured from the bottom of the groove, lies in the range of from 0.3 to 0.5 mm.

18. The shaft sealing ring as claimed in claim 12, wherein the sealing contact pressure referred to the periphery of the shaft lies in the range of from 0.1 to 0.4 N/cm.

19. The shaft sealing ring as claimed in claim 1 wherein the thread has a pitch of between 0.6 and 0.8.

* * * * *